(12) United States Patent
Kim et al.

(10) Patent No.: US 12,139,080 B2
(45) Date of Patent: Nov. 12, 2024

(54) APPARATUS FOR DIAGNOSTICS COMMUNICATION ERROR OF VEHICLE, SYSTEM HAVING THE SAME, AND METHOD THEREOF

(71) Applicants: HYUNDAI MOTOR COMPANY, Seoul (KR); Kia Corporation, Seoul (KR)

(72) Inventors: Beom Sik Kim, Hwaseong-si (KR); So Jin Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 483 days.

(21) Appl. No.: 17/471,808

(22) Filed: Sep. 10, 2021

(65) Prior Publication Data

US 2022/0324395 A1    Oct. 13, 2022

(30) Foreign Application Priority Data

Apr. 7, 2021    (KR) .......................... 10-2021-0045434

(51) Int. Cl.
  *B60R 16/023*    (2006.01)
  *G07C 5/08*    (2006.01)

(52) U.S. Cl.
  CPC .......... *B60R 16/023* (2013.01); *G07C 5/0808* (2013.01); *G07C 5/0816* (2013.01)

(58) Field of Classification Search
  CPC .. B60R 16/023; G07C 5/0808; G07C 5/0816; G07C 5/085; G07C 2205/02; G05B 23/0262; G05B 2219/24065; B60W 50/0205; B60W 2050/0005; B60W 2050/021; B60W 2556/45; H04L 1/20; H04L 43/0823; B60Y 2306/15
  USPC .......................................................... 701/29
  See application file for complete search history.

(56) References Cited

U.S. PATENT DOCUMENTS

| | | | |
|---|---|---|---|
| 2003/0061857 A1* | 4/2003 | Keller ..................... | G01W 1/18 73/1.01 |
| 2011/0041158 A1* | 2/2011 | Ranzini .................. | G06Q 20/04 726/1 |
| 2014/0005880 A1* | 1/2014 | Guenkova-Luy ....... | H04L 67/12 701/31.4 |
| 2018/0267922 A1* | 9/2018 | Nara ....................... | G06F 3/0623 |
| 2018/0370459 A1* | 12/2018 | Kwak .................. | B60R 16/0234 |
| 2020/0028736 A1* | 1/2020 | Park ....................... | H04W 72/23 |
| 2020/0076542 A1* | 3/2020 | Hwang ..................... | H04L 1/24 |
| 2020/0219335 A1* | 7/2020 | Gintz .................... | G05D 1/0022 |

(Continued)

*Primary Examiner* — Adam D Tissot
*Assistant Examiner* — Jean W Charleston
(74) *Attorney, Agent, or Firm* — MORGAN, LEWIS & BOCKIUS LLP

(57) ABSTRACT

A communication error diagnosis apparatus for a vehicle, a system including the same and a method thereof may provide a communication error diagnosis apparatus including: a processor configured to transmit a request message including diagnostic identifiers for diagnosing a plurality of controllers that perform vehicle functions and sequence identifiers of the controllers to the controllers depending on a sequence to receive response messages, and configured to analyze vehicle communication errors based on the response messages received from the controllers; and a storage configured to store data and algorithms driven by the processor.

19 Claims, 15 Drawing Sheets

(56) References Cited

U.S. PATENT DOCUMENTS

2020/0273268 A1* 8/2020 Bhattacharyya .............................. G06Q 10/06315
2020/0382597 A1* 12/2020 Jung ................... H04L 12/4135

* cited by examiner

APPARATUS FOR DIAGNOSTICS COMMUNICATION ERROR OF VEHICLE, SYSTEM HAVING THE SAME, AND METHOD THEREOF

CROSS-REFERENCE TO RELATED APPLICATION

The present application claims priority to Korean Patent Application No. 10-2021-000045434, filed on Apr. 7, 2021, the entire contents of which is incorporated herein for all purposes by this reference.

BACKGROUND OF THE INVENTION

Field of the Invention

The present invention relates to a communication error diagnosis apparatus for a vehicle, a system including the same and a method thereof, and more particularly, to a technique for diagnosing an error of low-voltage differential signaling (LVDS) communication in a vehicle.

Description of Related Art

As vehicle technology develops, more diverse and complex measuring and sensing functions are provided to recently released vehicles. Such sensing functions are controlled by an electronic controller, i.e., an electronic control unit (ECU), of a vehicle.

Accordingly, a plurality of controllers are provided in the vehicle, data are transmitted and received between the controllers, and diagnosis is required to verify data quality.

However, conventionally, fault diagnosis is performed based on ISO 14229-1 UDS integrated diagnostic service, and an LVDS fault diagnosis method is about to be implemented as a general function (0×22, 0×23) except for a secure target diagnostic service, which corresponds to a risk function (0×2E, 0×3D) where only certified diagnostic equipment is allowed. Among general functions, ReadDataByIndentifier (0×22) gets the desired data (result value) from the controller through diagnostic identifier (DID), and this ReadDataByIndentifier (0×22) is suitable for reading information related to a single controller, but since I2C communication between controllers is limited, it is impossible to secure LVDS image diagnosis data, and thus there is a limit to LVDS fault diagnosis that requires image quality checking.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a communication error diagnosis apparatus for a vehicle, a system including the same and a method thereof, configured for analyzing an error cause at a vehicle level by diagnosing a low voltage differential signaling (LVDS) communication error between a plurality of controllers in a vehicle and minimizing a time for the error cause analysis.

The technical objects of the present invention are not limited to the objects mentioned above, and other technical objects not mentioned can be clearly understood by those skilled in the art from the description of the claims.

Various aspects of the present invention are directed to providing a communication error diagnosis apparatus including: a processor configured to transmit a request message including diagnostic identifiers for diagnosing a plurality of controllers that perform vehicle functions and sequence identifiers of the controllers to the controllers depending on a sequence to receive response messages, and configured to analyze vehicle communication errors based on the response messages received from the controllers; and a storage configured to store data and algorithms driven by the processor.

In various exemplary embodiments of the present invention, the request message may include a diagnostic identifier (DID), a sequence Identifier (SID), and input variables for the SID.

In various exemplary embodiments of the present invention, the DID may include at least one of device connection information; a line fault diagnostic service for diagnosing short-circuit or disconnection in transmission lines; a lock indicator diagnostic service for diagnosing whether connection between controllers in a vehicle system is made; an ERRB indicator FWD channel diagnostic service for diagnosing occurrence of a bit error in a signal received from a receiving end; an ERRB indicator REV channel diagnostic service for diagnosing occurrence of a bit error in a signal received from a transmitter; or an eye opening monitor diagnostic service.

In various exemplary embodiments of the present invention, the DID may include diagnosis start, diagnosis step, and diagnosis end.

In various exemplary embodiments of the present invention, the response message may include a DID, a SID, and a response result.

Various aspects of the present invention are directed to providing a communication error diagnosis system including: a first controller configured to perform a first function of the vehicle; a second controller configured to perform a second function of the vehicle; and a communication error diagnosis apparatus configured to transmit a request message including a DID and a SID for diagnosis of the first controller to the first controller to receive a response message from the first controller, to transmit a request message including a DID and a SID for diagnosis of the second controller to the second controller to receive a response message from the second controller, and to analyze a vehicle communication error between the first controller and the second controller based on the response message of the first controller and the response message of the second controller.

In various exemplary embodiments of the present invention, the first controller and the second controller may be included in a vehicle system, and the communication error diagnosis apparatus may communicate with the first controller and the second controller outside the vehicle system.

In various exemplary embodiments of the present invention, the system may further include an on board diagnostics (OBD) port configured to connect the communication error diagnosis apparatus and the vehicle system.

In various exemplary embodiments of the present invention, the system may further include a gateway configured to perform communication with the communication error diagnosis apparatus in a first communication method and to communicate with the first controller and the second controller in a second communication method.

In various exemplary embodiments of the present invention, the first communication method may be a D-HSCAN, and the second communication method may be Ethernet.

In various exemplary embodiments of the present invention, the communication error diagnosis apparatus may transmit a request message including a DID, a SID, and master role assignment for diagnosis of the first controller to the first controller, and may receive a response message thereto from the first controller.

In various exemplary embodiments of the present invention, the communication error diagnosis apparatus may receive the response message from the first controller, and then may transmit a request message including a DID, a SID, and slave role assignment for diagnosis of the second controller to the second controller, and may receive a response message thereto from the second controller.

In various exemplary embodiments of the present invention, the communication error diagnosis apparatus may transmit a request message checking setting of a first parameter for diagnostic preparation of the first controller to the first controller, and may receive a response message thereto from the first controller.

In various exemplary embodiments of the present invention, the communication error diagnosis apparatus may receive the response message from the first controller, and then may transmit a request message checking setting of a second parameter for diagnostic preparation of the second controller to the second controller, and may receive a response message thereto from the second controller.

In various exemplary embodiments of the present invention, the communication error diagnosis apparatus, when the settings of the first parameter of the first controller and the second parameter of the second controller are checked, may transmit a request message for requesting setting of a third parameter for performing diagnosis of the second controller to the second controller, which is a slave, and may receive a response message thereto from the second controller.

In various exemplary embodiments of the present invention, the second controller may include a value that can distinguish between a normal state and a failure state in the response message and may transmit it to the communication failure diagnosis apparatus.

In various exemplary embodiments of the present invention, the communication error diagnosis apparatus may transmit a request message for requesting setting of a fourth parameter for performing diagnosis of the first controller to the first controller, which is a master, and the first controller may set the fourth parameter and release the setting of the fourth parameter after performing diagnosis.

In various exemplary embodiments of the present invention, the first controller may transmit a diagnostic result of the first controller to the communication error diagnosis apparatus.

In various exemplary embodiments of the present invention, the communication error diagnosis apparatus, when a diagnostic result is received from the first controller and the second controller, may transmit a request message for requesting termination of the diagnosis of the second controller to the second controller, when a response message thereto is received from the second controller, may transmit a request message for requesting termination of the diagnosis of the first controller to the first controller, and when a response message thereto is received from the first controller, may terminate a diagnosis process.

Various aspects of the present invention are directed to providing a communication error diagnosis method including: transmitting a request message including a DID and a SID for diagnosis of a first controller performing a first function of the vehicle to the first controller; receiving a response message from the first controller; transmitting a request message including a DID and a SID for diagnosis of a second controller performing a second function of the vehicle to the second controller; receiving a response message from the first controller; and analyzing a vehicle communication error between the first controller and the second controller based on the response message of the first controller and the response message of the second controller.

According to the present technique, it is possible to analyze an error cause at a vehicle level by diagnosing a low voltage differential signaling (LVDS) communication error between a plurality of controllers in a vehicle and to minimize a time for the error cause analysis.

Furthermore, various effects that can be directly or indirectly identified through this document may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
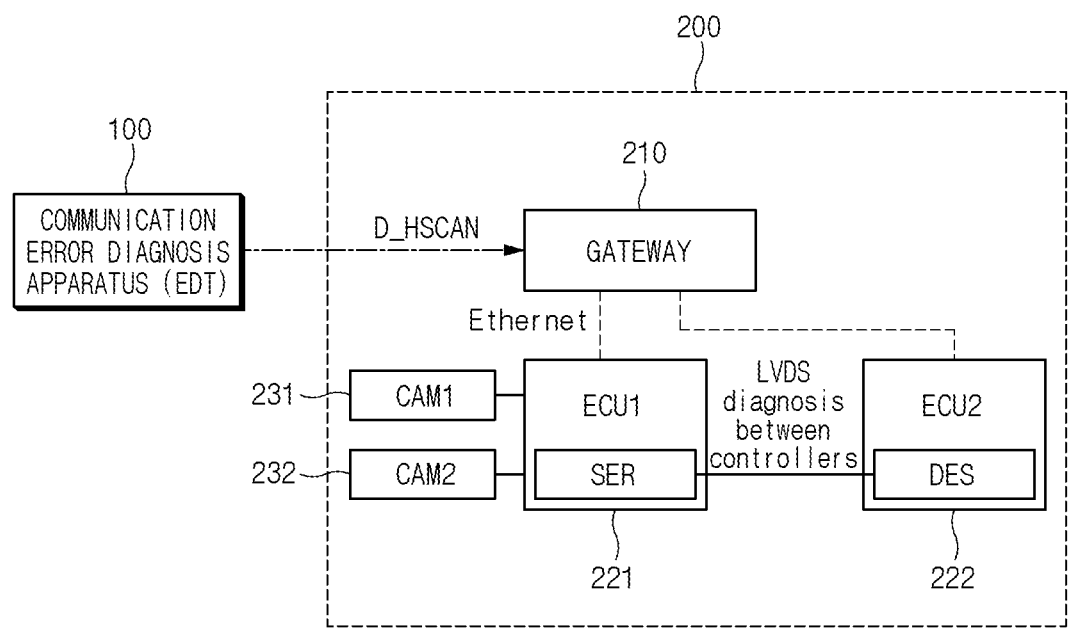
FIG. 1 illustrates a block diagram showing a configuration of a diagnosis system including a communication error diagnosis apparatus for a vehicle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the exemplary embodiment of the present invention.

Hereinafter, various exemplary embodiments of the present invention will be described in detail with reference to FIG. 1 to FIG. 15.

Figure 2:
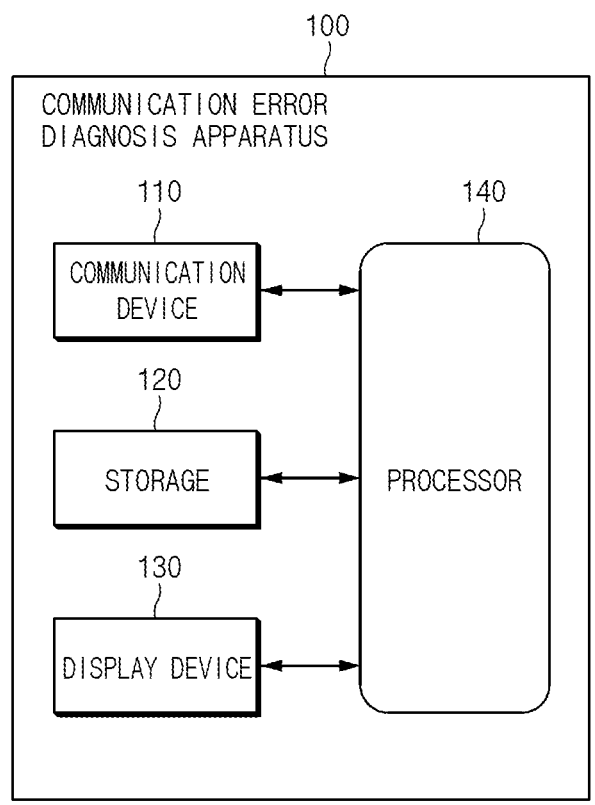
FIG. 2 illustrates a detailed schematic diagram of a communication error diagnosis apparatus for a vehicle according to various exemplary embodiments of the present invention.
Figure 3:
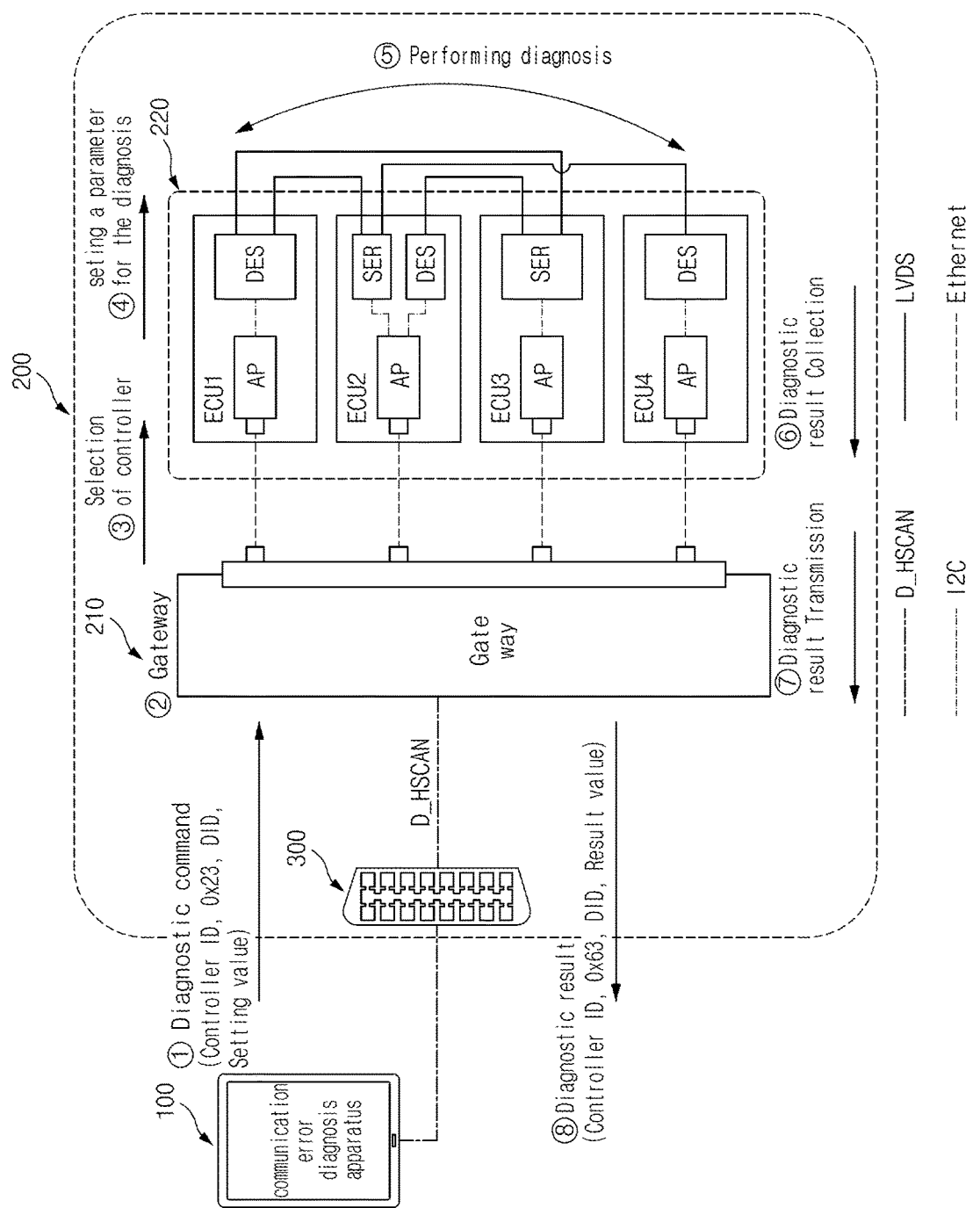
FIG. 3 illustrates detailed diagram of a configuration of a diagnosis system including a communication error diagnosis apparatus for a vehicle according to various exemplary embodiments of the present invention.

FIG. 1 illustrates a block diagram showing a configuration of a diagnosis system including a communication error diagnosis apparatus for a vehicle according to various exemplary embodiments of the present invention, and FIG. 2 illustrates a detailed schematic diagram of a communication error diagnosis apparatus for a vehicle according to various exemplary embodiments of the present invention. FIG. 3 illustrates detailed diagram of a configuration of a diagnosis system including a communication error diagnosis apparatus for a vehicle according to various exemplary embodiments of the present invention.

Referring to FIG. 1, a communication error diagnosis system for a vehicle according to various exemplary embodiments of the present invention may include a communication error diagnosis apparatus 100 for a vehicle and a vehicle system 200.

The communication error diagnosis apparatus 100 according to various exemplary embodiments of the present invention may be implemented as a separate apparatus outside the vehicle, and may be connected to the vehicle system 200 through an on board diagnostics (OBD) port 300 as illustrated in FIG. 3. In the instant case, the communication error diagnosis apparatus 100 may be connected to the OBD port 300 in a D-HSCAN way.

The communication error diagnosis apparatus 100, which is an external diagnosis tester (EDT), may include a smart phone, a tablet personal computer (PC), a mobile phone, a video phone, an e-book reader, a netbook computer, a personal digital assistant (PDA), a portable multimedia player (PMP), a mobile communication terminal, an electronic notebook, and the like, and may be installed with a vehicle interworking application that interworks with the vehicle system 200. The vehicle interworking application may be downloaded through wireless communication or the Internet, and may be automatically installed after being downloaded.

The communication error diagnosis apparatus 100 may sequentially secure image diagnosis data of a plurality of controllers by utilizing the ReadMemoryByAddress (23h), and may display diagnostic results on a screen. In the instant case, the ReadMemoryByAddress (23h) is a diagnostic service to perform each diagnostic function, diagnostic identifiers (DID) identify diagnostic functions, and sequence identifiers (SID) include control of diagnostic processes.

The communication error diagnosis apparatus 100 transmits diagnostic commands to the controllers depending on a predetermined order. The communication error diagnosis apparatus 100 transmits a diagnostic command (controller ID, 0x23, DID, setting value) for diagnosis of a diagnosis target controller in a D-HSCAN way depending on a UDS diagnosis specification. The controller ID is a unique controller number in the vehicle. "0x23" indicates ReadMemoryBy Address in a UDS diagnosis service. The DID indicates a diagnostic identifier, and the setting value indicates a SID and a diagnostic attribute value.

The vehicle system 200 may include a gateway 210, a plurality of controllers 221 and 222, and cameras 231 and 232 connected to the controllers 221 and 222. The communication error diagnosis apparatus 100 in various exemplary embodiments of the present invention may perform diagnosis of transmission and reception data between the controllers 221 and 222.

The communication error diagnosis apparatus 100 is connected to the gateway 210 through the OBD port 300, and may be connected in the D-HSCAN way.

The gateway 210 for the vehicle may be provided with a predetermined diagnostic communication interface module, and may communicate with an external communication error diagnosis apparatus 100 for a vehicle through a diagnostic communication interface module. Herein, the diagnostic communication interface module may provide at least one of an Ethernet communication function, a Bluetooth communication function, a Wi-Fi communication function, a near-field connection (NFC) communication function, a wideband code division multiple access (WCDMA) communication function, a long term evolution (LTE) communication function, or a LTE-Advanced communication function.

That is, the gateway 210 may convert a diagnostic command of the communication error diagnosis apparatus 100 which is inputted through the D-HSCAN into HSCAN, CANFD, and Ethernet format depending on a communication method of a target controller, and the controller communication method may be different for each vehicle model.

The plurality of controllers 221 and 222 may include controllers that, respectively implement remote smart parking assist (RSPA), advanced driver assistance systems (ADAS), forward collision-avoidance assist (FCA), lane keeping assist (LKA), blind-spot collision-avoidance assist (BCA), smart cruise control (SCC), surround view monitor (SVM), head up display (HUD), etc. To the present end, the controllers 221 and 222 may be implemented in a form in which hardware and software are combined, and may be, for example, an electronic control unit (ECU), a micro controller unit (MCU), a central processing unit (CPU), or other subcontrollers mounted in a vehicle. In various exemplary embodiments of the present invention, for convenience of description, the controller will be described as an ECU.

Furthermore, the controllers 221 and 222 may include one or more than one application processor (AP), a serializer (SER), or a deserializer (DES). The application processor (AP), which is a central processing unit, may implement a function of the corresponding controller, and the SER may transmit a signal, and the DES may receive a signal from the SER. Referring to FIG. 3, a plurality of controllers ECU1, ECU2, ECU3, and ECU4 transmit and receive data to or from each other. In the instant case, since diagnosis of data transmitted and received between the controllers was previously impossible, the present invention intends to diagnose the data transmitted and received between the controllers.

When each of the plurality of controllers 220, ECU1, ECU2, ECU3, and ECU4 is selected as a diagnostic target, a diagnostic register value of the controller is set depending on a function (DID) to be performed. Then, the controller that sets the diagnostic register value performs diagnosis depending on the function, and records a result thereof in a diagnostic register. The controllers 220 may transmit the collected diagnostic results (controller ID, 0x63, DID, result value) to the gateway 210, and the gateway 210 may transmit a diagnostic result thereof to the communication error diagnosis apparatus 100 through the D-HSCAN.

For a diagnostic process of FIG. 3, the communication error diagnosis apparatus 100 transmits (①) a diagnostic command (controller ID, 0x23, DID, set value) to the vehicle system 200, and transfers (②) the diagnostic command to the selected controller through the gateway 210 of the vehicle system 200 (③). In the instant case, the controller ID indicates information related to the selected controller, "0x23" indicates ReadMemoryByAddress (23h) as a diagnostic service item, the DID means a diagnostic identifier, and a setting value indicates a parameter value for preparing or executing diagnosis. A request frame message including such information will be described in detail with reference to Table 1.

Accordingly, the controller receiving the diagnostic command sets a parameter for the diagnosis (④) and performs the diagnosis (⑤). Then, the controllers that performed the diagnosis collect (⑥)diagnostic results and transmit (⑦) the diagnostic result to the communication error diagnosis apparatus 100 outside the vehicle, and the communication error diagnosis apparatus 100 displays (⑧) the diagnostic results (controller ID, 0x63, DID, result value). In the instant case, the diagnostic results will be described in detail with reference to Table 2 later.

Accordingly, the communication error diagnosis apparatus 100 in various exemplary embodiments of the present invention may transmit and receive communication performance verification data between the controllers through diagnosis communication, and may verify a problem that occurs in LVDS image communication.

Referring to FIG. 2, the communication error diagnosis apparatus 100 may include a communication device 110, a storage 120, a display device 130, and a processor 140.

The communication device 110 may perform wireless or wired communication with the vehicle system 200, and may perform D-HSCAN communication as an example.

The storage 120 may store data and/or algorithms required for the processor 140 to operate, and the like.

As an example, the storage 120 may store an algorithm and data for diagnosis. Furthermore, the storage 120 may store information related to an in-vehicle controller configured for diagnosis, etc.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, or an optical disk.

The display device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. Furthermore, the input means may include a soft key implemented on the display.

The output device may include a display, and may also include a voice output means such as a speaker. In the instant case, when a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), a an organic light emitting diode display (OLED display), a flexible display, a field emission display (FED), or a 3D display. In particular, in various exemplary embodiments of the present invention, the display device 130 may display a diagnosis request menu and a diagnosis performance result.

Figure 4:
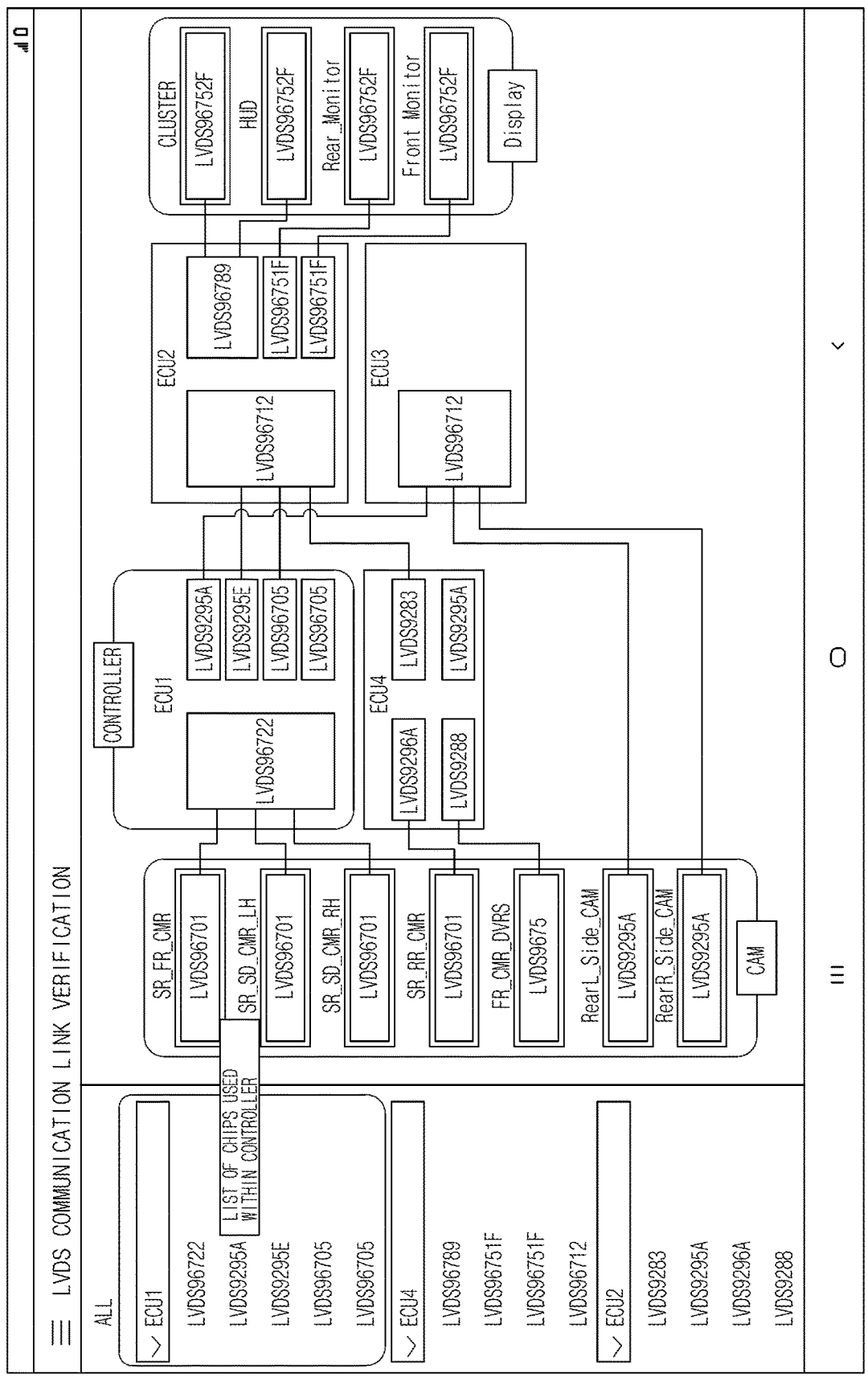
FIG. 4 illustrates an example of a screen of a screen configuration of a communication error diagnosis apparatus for a vehicle according to various exemplary embodiments of the present invention.
Figure 5:
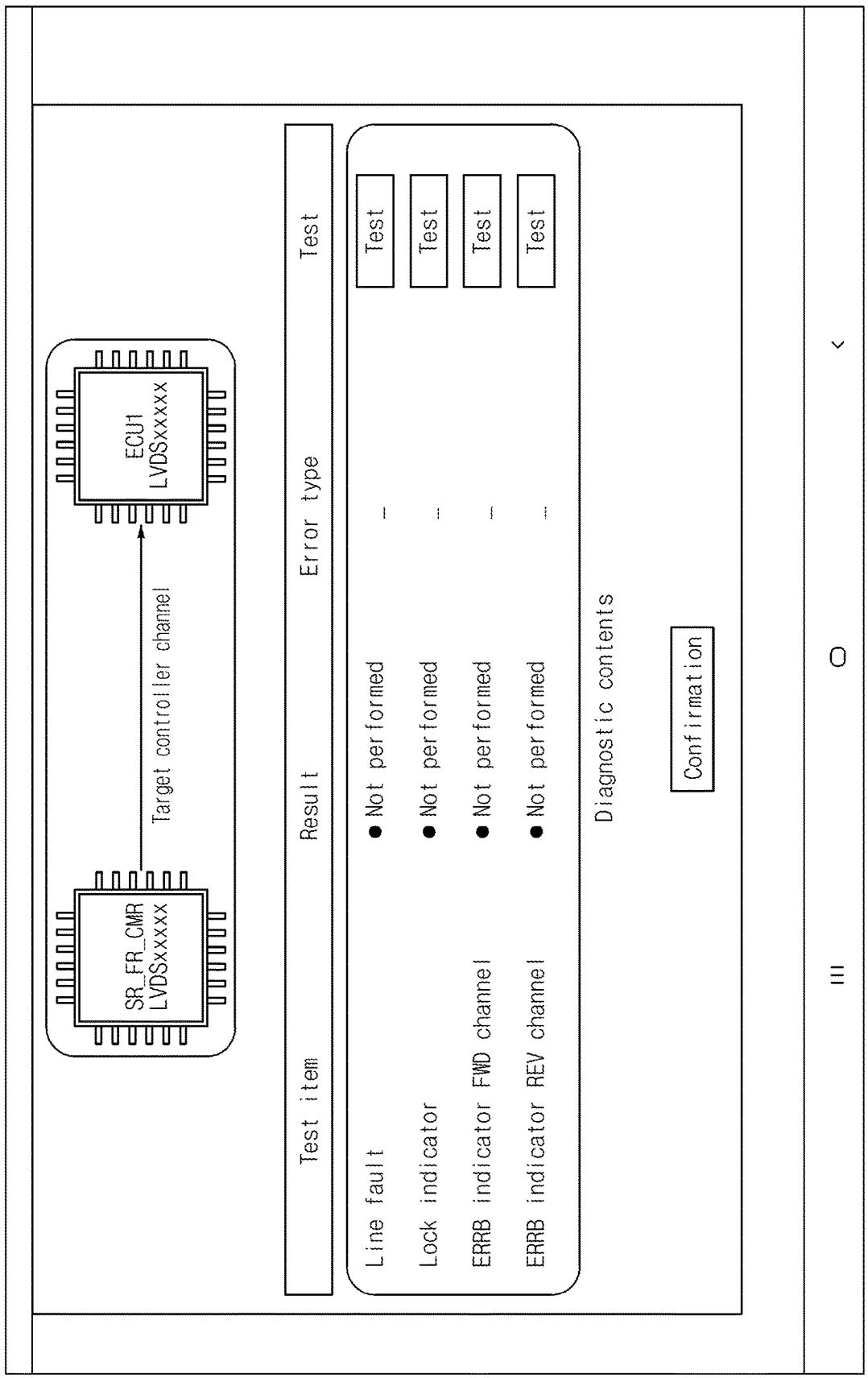
FIG. 5 illustrates an example of a screen of a diagnosis selection menu of a communication error diagnosis apparatus for a vehicle according to various exemplary embodiments of the present invention.

FIG. 4 illustrates an example of a screen of a screen configuration of a communication error diagnosis apparatus of a vehicle according to various exemplary embodiments of the present invention, and FIG. 5 illustrates an example of a screen of a screen configuration diagnosis selection menu of a communication error diagnosis apparatus of a vehicle according to various exemplary embodiments of the present invention.

Referring to FIG. 4, when a diagnosis algorithm of the communication error diagnosis apparatus 100 is performed, a diagnostic session control message is sent to the in-vehicle controller, the LVDS controller is checked through a response ID received from the in-vehicle controller, and by checking connection information related to the corresponding controller, as illustrated in FIG. 4, the controller to which connected LVDS video communication is applied is displayed at a left side of a screen of the display device 130, and topology is displayed at a right side such that a connection relationship can be known.

Referring to FIG. 5, the display device 130 displays a screen for selecting a link for diagnosis and selecting a desired diagnosis function, and when a user presses a corresponding function (e.g., test) menu, the communication error diagnosis apparatus 100 transmits a corresponding diagnosis message to perform diagnosis. Furthermore, the display device 130 displays a received diagnostic result.

The processor 140 may be electrically connected to the communication device 110, the storage 120, the display device 130, and the like, may electrically control each component, and may be an electrical circuit that executes software commands, performing various data processing and calculations described below.

The processor 140 may process a signal transferred between components of the communication error diagnosis apparatus 100, and may perform overall controller such that each of the components can perform its function normally.

The processor 140 may be implemented in a form of hardware, software, or a combination of hardware and software, or may be implemented as microprocessor.

The processor 140 may transmit a request message including diagnostic identifiers for diagnosing the controllers that perform vehicle functions and sequence identifiers of the controllers to the controllers depending on a sequence to receive response messages, and may analyze communication errors based on the response messages received from the controllers.

In the instant case, the request message may include a DID, a SID, and input variables for the SID.

Furthermore, the response message may include a DID, a SID, and a response result.

TABLE 1

| | | | Request frame | | |
|---|---|---|---|---|---|
| UDS Service | ALFLD | VADD | Memory Address | | Memory Size |
| | | | DID | SID | PARAM |
| 23 | 1X | LVDS_TEST | DID_LBIST [Table 3] | Diagnostic procedure [Table 4] | SID input variables | XX |

TABLE 2

| | | Response Frame | | |
|---|---|---|---|---|
| UDS Service | Size | DID | SID | Return Value |
| 63 | XX | DID Value [Table 3] | Diagnostic procedure [Table 4] | 00 = normal, other values are errors. |

Table 1 is a list of diagnostic services used for LVDS diagnosis, Table 1 is an example of a request frame message transmitted by the communication error diagnosis apparatus 100 for diagnosis, and Table 2 is an example of a response frame message transmitted from a controller to the communication error diagnosis apparatus 100.

Referring to Table 1, as a request frame message structure for requesting information from the communication error diagnosis apparatus (EDT) 100 to the controller (ECU), the request frame message may include fields such as a UDS service, an ALFID (addressAndLengthFormatIdentifier), a memory address, and a memory size, and in particular, the memory address includes a VADD (virtual address), a DID, a SID, and a parameter. The VADD indicates a name of the LVDS test, the DID indicates a diagnosis list (refer to Table 3 below), the SID indicates a sequence identifier (refer to Table 4 below), and the parameter indicates SID input variables. Although DID_LBIST is described as a DID value in Table 1, one of the DID values of Table 3 may be described as an example. Furthermore, the VADD (virtual address) of the memory address field is a virtual address indicating the LVDS diagnostic interface (LVDS_TEST), and is a predetermined unique value (e.g., 0x2020). When ALFID (addressAndLengthFormatIdentifier) and DID values are inputted as messages, the ECU becomes aware of the LVDS fault diagnosis request (e.g., 23 X0 2020). In the ALFID (addressAndLengthFormatIdentifier), the lower 4 bits (memory address) are always 0, and upper 4 bits (memory size) is a memory size of subsequent input values and supports up to 15 bytes.

Table 2 shows a response format structure, and a response value (return value) varies depending on the SID. In the instant case, when the response value is 0, the controller is in a normal state, any other value may be considered as an error, and a case where a specific value is specified (ErrorCount, etc.) may be excluded.

Furthermore, the DID may include at least one of device connection information; a line fault diagnostic service for diagnosing short-circuit or disconnection in a transmission line; a lock indicator diagnostic service for diagnosing whether connection between controllers in a vehicle system is made; an ERRB indicator forward channel diagnostic service for diagnosing occurrence of a bit error in a signal received from a receiving end; an ERRB indicator reverse channel diagnostic service for diagnosing occurrence of a bit error a signal received from a transmitter; or an eye opening monitor diagnostic service.

TABLE 3

DID Value

| DID | HEX | Description |
| --- | --- | --- |
| DID_LIF | A001 | Device connection information |
| DID_LIF | A101 | Line Fault |
| DID_LLI | A102 | Lock Indicator |
| DID_LEIFC | A103 | ERRB Indicator FWD Channel |
| DID_LEIRC | A104 | ERRB Indicator REV Channel |
| DID_LBIST | A105 | BIST For Serial Link |
| DID_LEOM | A106 | Eye Opening Monitor |
| DID_LLMT | A107 | Link Margin Test |
| DID_LECR | A108 | Error Correction through Retransmission |

TABLE 4

Sequence Identifier (SID)

| Sequence (SID) | HEX | Req/Res | Parameter | Description |
| --- | --- | --- | --- | --- |
| Test Start (SID_TRST) | 00 | Req | CH# | Slave[7] Channel No[6:0] | Starting diagnosis, transferring channel number [MSB] Master = 0, Slave = 1 |
| | | Res | CH# | Slave[7] Channel No[6:0] | Transferring set channel information [MSB] Master = 0, Slave = 1 |
| Step1 (SID_STEP1) | 01 | Req | — | param1 Checking/Setting |
| | | Res | Result | 00, other values are errors. |
| Step2 (SID_STEP1) | 02 | Req | — | Param2 Checking/Setting |
| | | Res | Result | 00, other values are errors. |
| Step# (SID_STEP#) | XX | Req | — | Param# Checking/Setting |
| | | Res | Result | 00, other values are errors. |
| Test Stop (SIDTF) | 7F | Req | CH# | Slave[7] Channel No[6:0] | Ending diagnosis, transferring channel number [MSB] Master = 0, Slave = 1 |
| | | Res | CH# | Slave[7] Channel No[6:0] | Transferring ended channel information [MSB] Master = 0, Slave = 1 |

Table 3 is a table showing examples of DID values, and Table 4 is a table showing examples of SID.

Referring to Table 3, the DID indicates the DID for supporting such as DID_LIF, DID_LLF, . . . , and DID_LECR.

DID_LIF indicates device connection information, and when expressed as a HEX value, it becomes A001. DID_LLF indicates a line fault, DID_LLI indicates a lock indicator, DID_LEIFC ERRB indicates an indicator FWD channel, DID_LEIRC indicates an ERRB indicator REV channel, DID_LBIST indicates a BIST for serial link, DID_LEOM indicates an eye opening monitor, DID_LLMT indicates an link margin test, DID_LECR indicates an error correction through retransmission.

In the instant case, among the DIDs, DID_LIF, DID_LLI, DID_LEIFC, DID_LEIRC, DID_LEOM, and DID_LECR performs single controller diagnosis as illustrated in FIG. 8 to FIG. 14, and for DID_LBIST and DID_LLMT, diagnosis between a plurality of controllers is performed. A DID_LBIST diagnosis service will be described in detail later with reference to FIG. 4.

Table 4 shows the SID depending on the DID in Table 3, and the SID includes only SID_TSRT and SID_TF, or SID_STEP1, . . . , and SID_STEP# may be added. Furthermore, a parameter may be set depending on the SID.

CH# information is transmitted as a parameter in a request frame, and CH# or result information is transmitted as a parameter in a response frame.

A diagnosis target controller is set as a master and an opposite controller is set as a slave, and master or slave setting information and the channel information (CH#) of the diagnosis target controller are merged together. For master/slave setting, when MSB is set to 0, it is the master, and when it is set to 1, it is the slave. Only the DID that requires master or slave designation are used, and no special distinction is required other than that.

For example,

[Slave]: CH#[7] bit, when MSB is 1, it is the slave.

[ChannelNo]: channel number diagnosed by Ch#[6:0]bits is transferred.

TABLE 5

BIST for Serial Link Message

| Data Byte | Parameter Name | Hex Value | Mnemonic |
| --- | --- | --- | --- |
| | Request Message | | |
| #1 | Service ID | 23 (ReadMemoryBy Address Req.) | RMBA |
| #2 | addressAndLengthFormatIdentifier | XX | ALFID |

TABLE 5-continued

BIST for Serial Link Message

| Data Byte | Parameter Name | | Hex Value | Mnemonic |
|---|---|---|---|---|
| #3 – #n | memoryAddress | Virtual Address | 2020 | LVDS_TEST |
| | | DID | D105 | DID_LBIST |
| | | SID | XX (See [Table 4]) | SID_ |
| | | Parameter | See [Table 4] | |
| #n + 1 | memory Size | | XX (see FIG. 6) | MS_ |
| Positive Response Message | | | | |
| #1 | Service ID | | 63 (ReadMemoryBy Positive Resp.) | RMBAPR |
| #2 – #n | dataRecord | Size | XX | SZ |
| | | DID | D105 | DID_LBIST |
| | | SID | XX (See [Table 4]) | SID_ |
| | | Parameter | See [Table 4] | |

Table 5 shows an example of a request message and a response message of a BIST for a serial link message among the DIDs of Table 3.

Referring to Table 5, MemorySize is 0 (not used), and MemoryAddress includes a virtual address, a DID, a SID, and a parameter, which respectively include LVDS_TEST, DID_LBIST, SID_. LVDS_TEST may be a unique value that specifies the LVDS diagnostic test (e.g., 0x2020), DID_LBIST may be a DID of the test currently being diagnosed, SID_ may be a processing sequence number during the process of the current diagnosing DID, and the parameter may include a channel number, etc.

Figure 6:
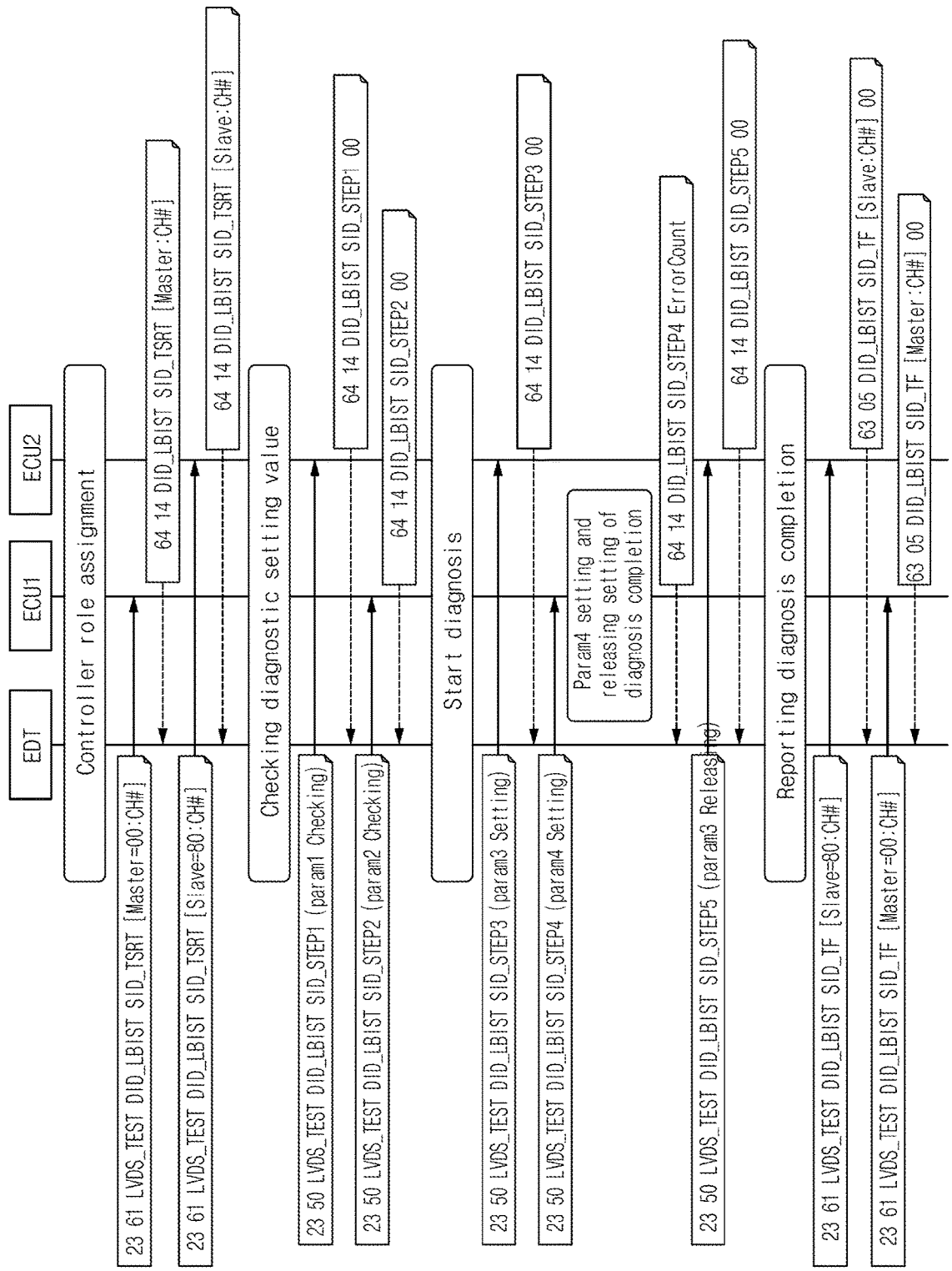
FIG. 6 schematically illustrates a diagnostic process of a BIST for a serial link sequence according to various exemplary embodiments of the present invention.

FIG. 6 schematically illustrates a diagnostic process of a BIST for a serial link sequence according to various exemplary embodiments of the present invention.

Referring to FIG. 6, the diagnosis starts with DID_LBIST and SID_TSRT (Test Start) and ends with DID_LBIST and SID_TF (Test Finish). With the parameter of SID_TSRT, a diagnosis target controller is set as the master and an opposite controller is set as the slave.

The communication error diagnosis apparatus (EDT) 100 may designate roles of the controllers ECU1 and ECU2 (S601).

The communication error diagnosis apparatus (EDT) 100 transmits a request frame message including "23 60 LVDS_TEST DID_LBIST SID_TSRT [Master=00:CH#]" to an ECU1, and the ECU1 transmits "63 04 DID_LBIST SID_TSRT [Master: CH#]" to the EDT in response. That is, the communication error diagnosis apparatus (EDT) 100 designates a role of the ECU1 as a master, and the ECU1 responds thereto, playing the role of the master. Before diagnosing, it is necessary to know channel information of a corresponding controller and configuration information of the other controller, and designate a channel through SID_TSRT for both.

In the instant case, transmission and reception between the communication error diagnosis apparatus (EDT) 100 and the controllers ECU1 and ECU2 may be performed through an in-vehicle gateway 210.

Accordingly, the communication error diagnosis apparatus (EDT) 100 transmits a request frame message including "23 60 LVDS_TEST DID_LBIST SID_TSRT [Slave=80: CH#]" to an ECU2, and the ECU2 transmits "63 04 DID_LBIST SID_TSRT [Slave:CH#]" to the EDT in response. That is, the communication error diagnosis apparatus (EDT) 100 designates a role of the ECU2 as a slave, and the ECU2 responds thereto, playing the role of the slave.

The communication error diagnosis apparatus (EDT) 100 sequentially transmits and confirms a diagnosis setting value confirmation request message for performing diagnosis to the plurality of controllers ECU1 and ECU2 (S602). Hereinafter, SID_STEP# is a step of setting registers for each controller depending on the SID.

The communication error diagnosis apparatus (EDT) 100 transmits a request frame message including "23 50 LVDS_TEST DID_LBIST SID_STEP1 (checking param1)" to the ECU1 to check setting of param1, which is a parameter which may be set to perform diagnosis, and the ECU1 transmits "63 04 DID_LBIST SID_STEP1 00" to the EDT in response. That is, as the communication error diagnosis apparatus (EDT) 100 may request to check whether the ECU1 has set param1, and the ECU1 responds that the param1 is set by sending "00" to the request, the communication error diagnosis apparatus 100 may check that the controller EUC1 is ready for diagnosis.

Accordingly, the communication error diagnosis apparatus (EDT) 100 transmits a request frame message including "23 50 LVDS_TEST DID_LBIST SID_STEP2 (checking param2)" to the ECU2 to check setting of param2, which is a parameter which may be set to perform diagnosis, and the ECU2 transmits "63 04 DID_LBIST SID_STEP2 00" to the EDT in response. That is, as the communication error diagnosis apparatus (EDT) 100 may request to check whether the ECU2 has set param2, and the ECU2 responds that the param2 is set by sending "00" to the request, the communication error diagnosis apparatus 100 may check that the controller EUC2 is ready for diagnosis.

The communication error diagnosis apparatus (EDT) 100 sequentially transmits a diagnosis start message to the controllers ECU1 and ECU2, and starts failure diagnosis (S603).

The communication error diagnosis apparatus (EDT) 100 transmits a request frame message including "23 50 LVDS_TEST DID_LBIST SID_STEP3 (setting param3)" to the ECU2 to check setting of param3, which is a parameter which may be set to start diagnosis, and the ECU2 transmits "63 04 DID_LBIST SID_STEP3 00" to the EDT in response. That is, as the communication error diagnosis apparatus (EDT) 100 may request the ECU2 to set param3, and the ECU2 responds that the param3 is set by sending "00" to the request, the communication error diagnosis apparatus 100 may check that the diagnosis of the controller EUC2 has been performed.

Accordingly, the communication error diagnosis apparatus (EDT) 100 transmits a request frame message including "23 50 LVDS_TEST DID_LBIST SID_STEP4 (setting param4)" to the ECU2 to check setting of param4, which is a parameter which may be set to perform diagnosis, and the ECU2 sets the param4 and releases the param4 after diagnosis is completed or a predetermined time period has elapsed. In the instant case, the ECU1, which is the master, may be set to be automatically released after presetting. Then, the ECU1 sends "63 04 DID_LBIST SID_STEP4 ErrorCount" to the EDT. In the instant case, when a result thereof is "00", it indicates normal, and when it is "ErrorCount", it may be determined as a failure state. In FIG. 6, as the ECU1 responds "ErrorCount" to the communication error diagnosis apparatus (EDT) 100, the communication error diagnosis apparatus (EDT) 100 may know that the ECU1 is in a failure state.

Meanwhile, the communication error diagnosis apparatus (EDT) 100 transmits "23 50 LVDS_TEST DID_LBIST SID_STEP5 (releasing param3)" to the ECU2 where the param3 is set to request the release of the param3, and the ECU2 responds that the setting of the param3 is released by sending "63 04 DID_LBIST SID_STEP5 00" in response.

The communication error diagnosis apparatus (EDT) 100 may display and report the diagnostic results of the controllers ECU1 and ECU2 on a screen (S604). When the diagnosis is completed and a result value is checked, the communication error diagnosis apparatus (EDT) 100 sends SID_TF to end the diagnosis and completes all diagnosis.

That is, the communication error diagnosis apparatus (EDT) 100 transmits "23 60 LVDS_TEST DID_LBIST SID_TF [Slave=80:CH#]" to the ECU2 to end the diagnosis, and the ECU2 transmits "63 05 DID_LBIST SID_TF [Slave:CH#] 00" to the communication error diagnosis apparatus (EDT) 100 in response thereto, ending the diagnosis of the ECU2.

Furthermore, the communication error diagnosis apparatus (EDT) 100 transmits "23 60 LVDS_TEST DID_LBIST SID_TF [Master=00:CH#]" to the ECU2 to end the diagnosis, and the ECU2 transmits "63 05 DID_LBIST SID_TF [Master:CH#] 00" to the communication error diagnosis apparatus (EDT) 100 in response, thereby ending the diagnosis of the ECU1.

Accordingly, the communication error diagnosis apparatus (EDT) 100 may determine whether there is abnormality in image data which is exchanged between the controllers ECU1 and ECU2 by sequentially controlling the controllers ECU1 and EUC2

Accordingly, according to various exemplary embodiments of the present invention, it is possible to rapidly diagnose and respond to image quality at a vehicle level, increasing reliability of the system.

Figure 7:
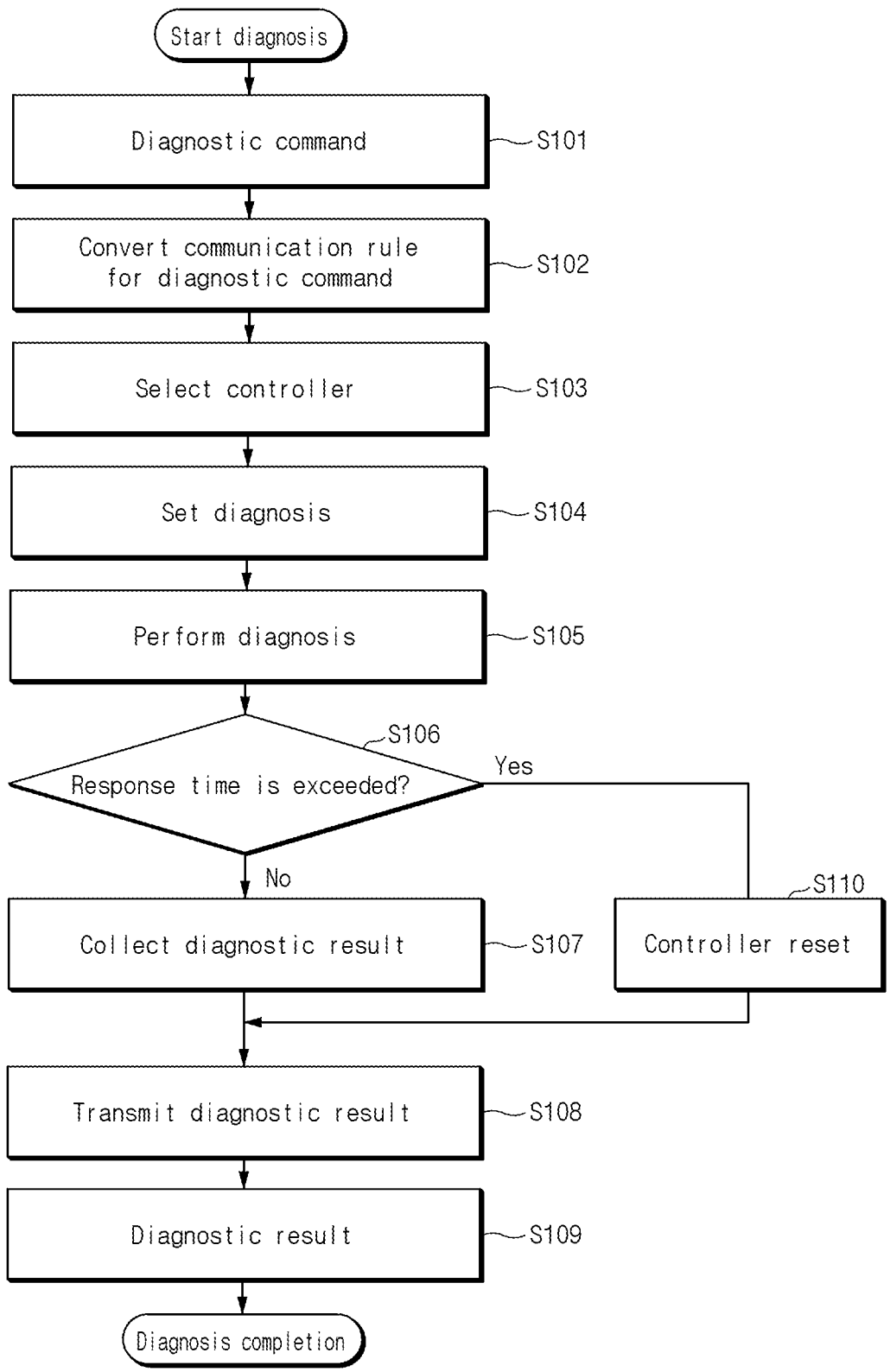
FIG. 7 illustrates a flowchart showing a communication error diagnosis method for a vehicle according to various exemplary embodiments of the present invention.

Hereinafter, a communication error diagnosis method for a vehicle according to various exemplary embodiments of the present invention will be described in detail with reference to FIG. 7. FIG. 7 illustrates a flowchart showing a communication error diagnosis method for a vehicle according to various exemplary embodiments of the present invention.

Hereinafter, it is assumed that the communication error diagnosis apparatus 100 of FIG. 1, the gateway 210, and the controllers ECU1 and ECU2 perform a process of FIG. 7. Furthermore, in the description of FIG. 7, operations described as being performed by the communication error diagnosis apparatus 100 may be understood as being controlled by the processor 140 of the communication error diagnosis apparatus 100.

The communication error diagnosis apparatus 100 transmits a diagnostic command (S101). The communication error diagnosis apparatus 100 transmits the diagnostic command (controller ID, 0x23, DID, setting value) for diagnosis of a diagnosis target controller in a D-HSCAN way depending on a UDS diagnosis specification. The controller ID is a unique controller number in the vehicle. "0x23" indicates ReadMemoryBy Address in a UDS diagnosis service. The DID indicates a diagnostic identifier, and the setting value indicates a SID and a diagnostic attribute value.

The gateway 210 converts a communication rule for a diagnostic command (S102). That is, the gateway 210 converts a diagnostic command of the communication error diagnosis apparatus 100 which is inputted through the D-HSCAN into HSCAN, CANFD, and Ethernet format depending on a communication method of a target controller.

The communication error diagnosis apparatus 100 selects a diagnosis target controller (S103). In the instant case, the diagnosis target controller is selected depending on a controller ID according to a UDS diagnosis specification.

The diagnosis target controller receiving the diagnostic command performs diagnosis setting (S104). That is, the diagnosis target controller receiving the diagnostic command sets a diagnostic register value of the controller depending on a function (DID) to be performed.

The controller that has set the diagnostic register value performs the diagnosis (S105). That is, the controller that sets the diagnostic register value performs diagnosis depending on the function, and records a result thereof in a diagnostic register.

The communication error diagnosis apparatus 100 determines whether a response waiting time from a control target controller is exceeded (S106), and resets the controller when it is exceeded (S110).

That is, the communication error diagnosis apparatus 100 determines that there is a problem when a predetermined response waiting time is exceeded after transmitting the diagnostic command to the controller, and transmits an ECU reset request command (0x11) to the controller and completes the diagnosis when receiving a reset response result (0x51). Furthermore, the communication error diagnosis apparatus 100 may request a reset from to controller when the diagnosis cannot be performed due to a problem in the controller. For example, the communication error diagnosis apparatus 100 may request a reset when there is no response during the test or when the diagnosis cannot be normally performed. In the instant case, the controller may use a soft reset among reset types.

Meanwhile, when the response waiting time from the control target controller is not exceeded, that is, when the response arrives within the response waiting time, the communication error diagnosis apparatus 100 collects diagnostic results from the controllers 220 (S107). That is, the communication error diagnosis apparatus 100 transmits the diagnostic command to read a diagnostic result recorded in the diagnostic register, and thus the diagnosis target controller collects a result value.

The controllers 220 transmits the collected diagnostic results (controller ID, 0x63, DID, result value) to the gateway 210 (S108), and the gateway 210 transmits a diagnostic result thereof to the communication error diagnosis apparatus 100 through the D-HSCAN (S109).

Accordingly, according to various exemplary embodiments of the present invention, an external in-vehicle data diagnosis apparatus 100 may secure image diagnosis data from a plurality of controllers by use of the ReadMemoryByAddress (23h) in a condition where it is difficult to secure LVDS image diagnosis data due to limited I2C communication between the controllers.

Figure 8:
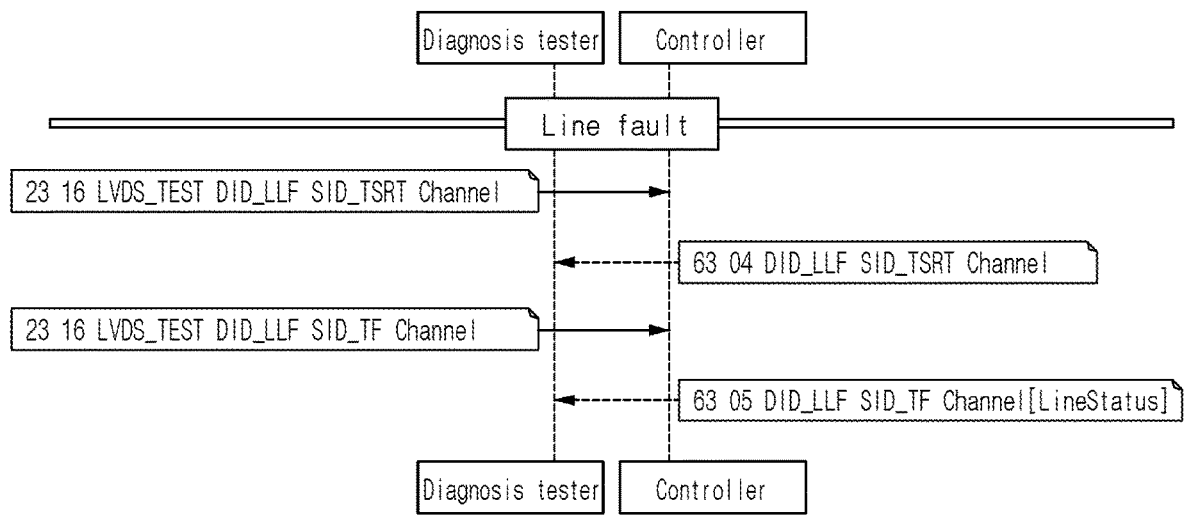
FIG. 8 schematically illustrates a diagnostic procedure of a line fault according to various exemplary embodiments of the present invention.

FIG. 8 schematically illustrates a diagnostic procedure of a line fault according to various exemplary embodiments of the present invention.

A line fault diagnosis service is a function that notifies whether a transmission line between Ser and Des has battery short-circuit, ground (GND) short-circuit, or disconnection. When a line fault error occurs, a SER/DES error pin output is changed to low.

For line fault diagnosis, DID_LLF (refer to Table 4) is used for the DID in Table 3. The SID may start with SID_TSRT and end with SID_TF, and a required parameter depending on the SID may be used as a value which is set by a user.

Figure 9:
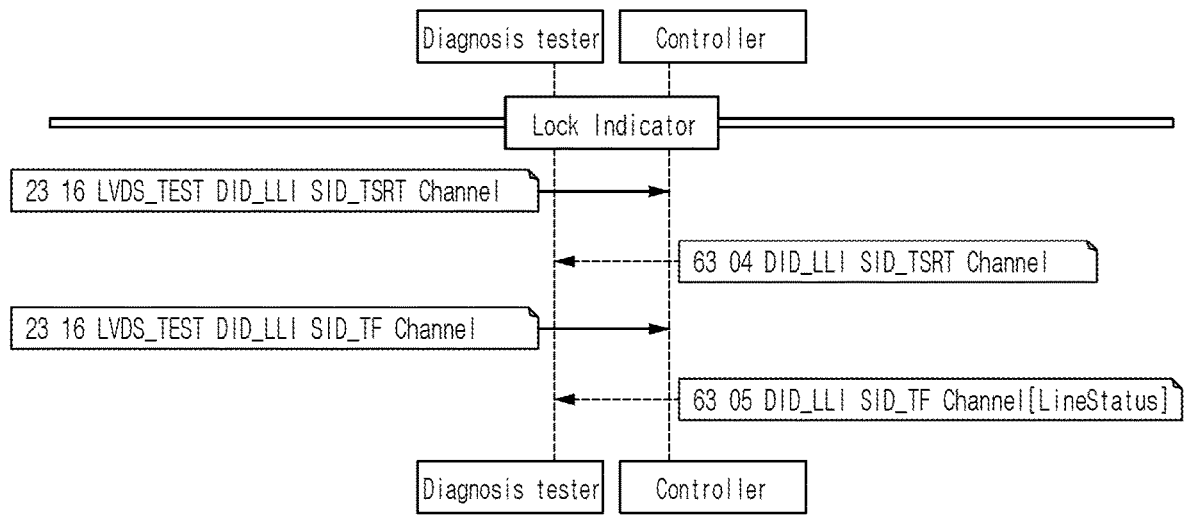
FIG. 9 schematically illustrates a diagnostic procedure of a lock indicator according to various exemplary embodiments of the present invention.

FIG. 9 schematically illustrates a diagnostic procedure of a lock indicator according to various exemplary embodiments of the present invention.

A lock indicator is a function to check whether Ser and Des connection is established. When disconnection occurs between Ser and Des using a LOCK pin, the output is changed to low, while when normally connected again, it returns to high.

DID_LLI (see Table 4) is used as the DID of the lock Indicator. The SID may start with SID_TSRT and end with SID_TF, and a required parameter depending on the SID may be set by a user.

Figure 10:
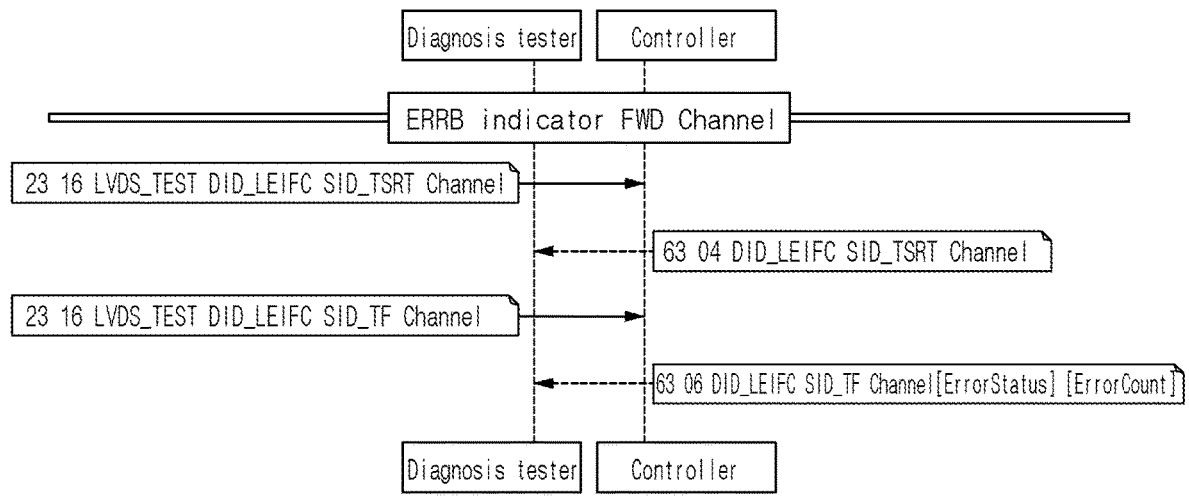
FIG. 10 schematically illustrates a diagnostic procedure of an ERRB indicator forward channel according to various exemplary embodiments of the present invention.

FIG. 10 schematically illustrates a diagnostic procedure of an ERRB indicator forward channel according to various exemplary embodiments of the present invention.

Information related to the ERRB indicator FWD channel may be received through a diagnostic service of the ERRB indicator FWD channel. The ERRB indicator FWD channel is a function of changing the ERRB pin to 1 when a bit error occurs in a signal received from a receiving end of a deserializer and a value which is designated by accumulating and storing a corresponding value in the register is exceeded.

DID_LEIFC (refer to Table 3) is used for the DID of the ERRB indicator FWD Channel. The SID may start with SID_TSRT and end with SID_TF, and a required parameter depending on the SID may be set by a user.

Figure 11:
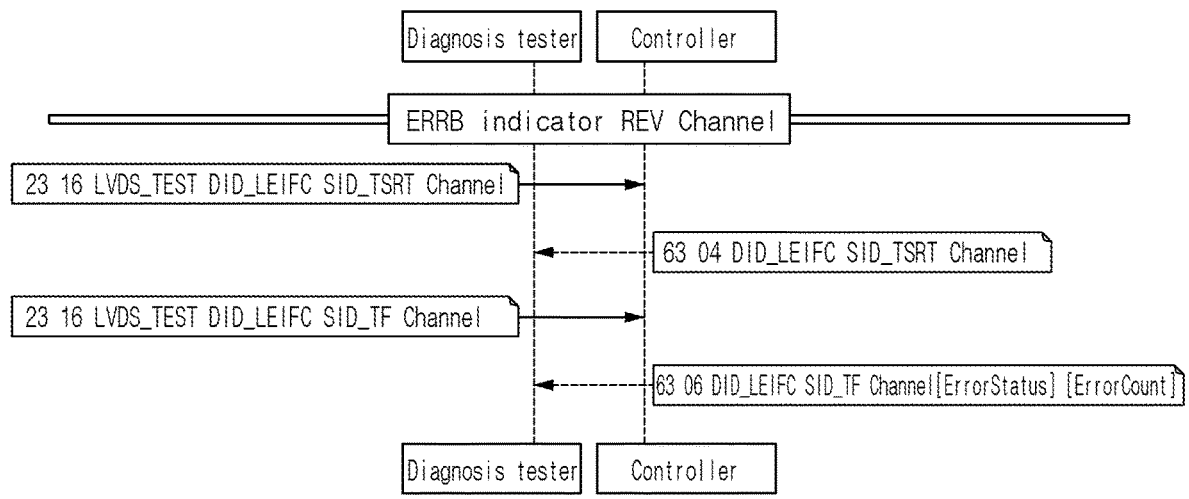
FIG. 11 schematically illustrates a diagnostic procedure of an ERRB indicator REV channel according to various exemplary embodiments of the present invention.

FIG. 11 schematically illustrates a diagnostic procedure of an ERRB indicator REV channel according to various exemplary embodiments of the present invention.

Information related to the ERRB indicator REV channel may be received through a diagnostic service of the ERRB indicator REV channel. The ERRB indicator REV channel is a function of changing the ERRB pin to 1 when a bit error occurs in a signal received from a transmitting end of a serializer and a value which is designated by accumulating and storing a corresponding value in the register is exceeded.

DID_LEIRC (refer to Table 2) is used for the DID of the ERRB indicator REV Channel. The SID may start with SID_TSRT and end with SID_TF, and a required parameter depending on the SID may be set by a user.

Figure 12:
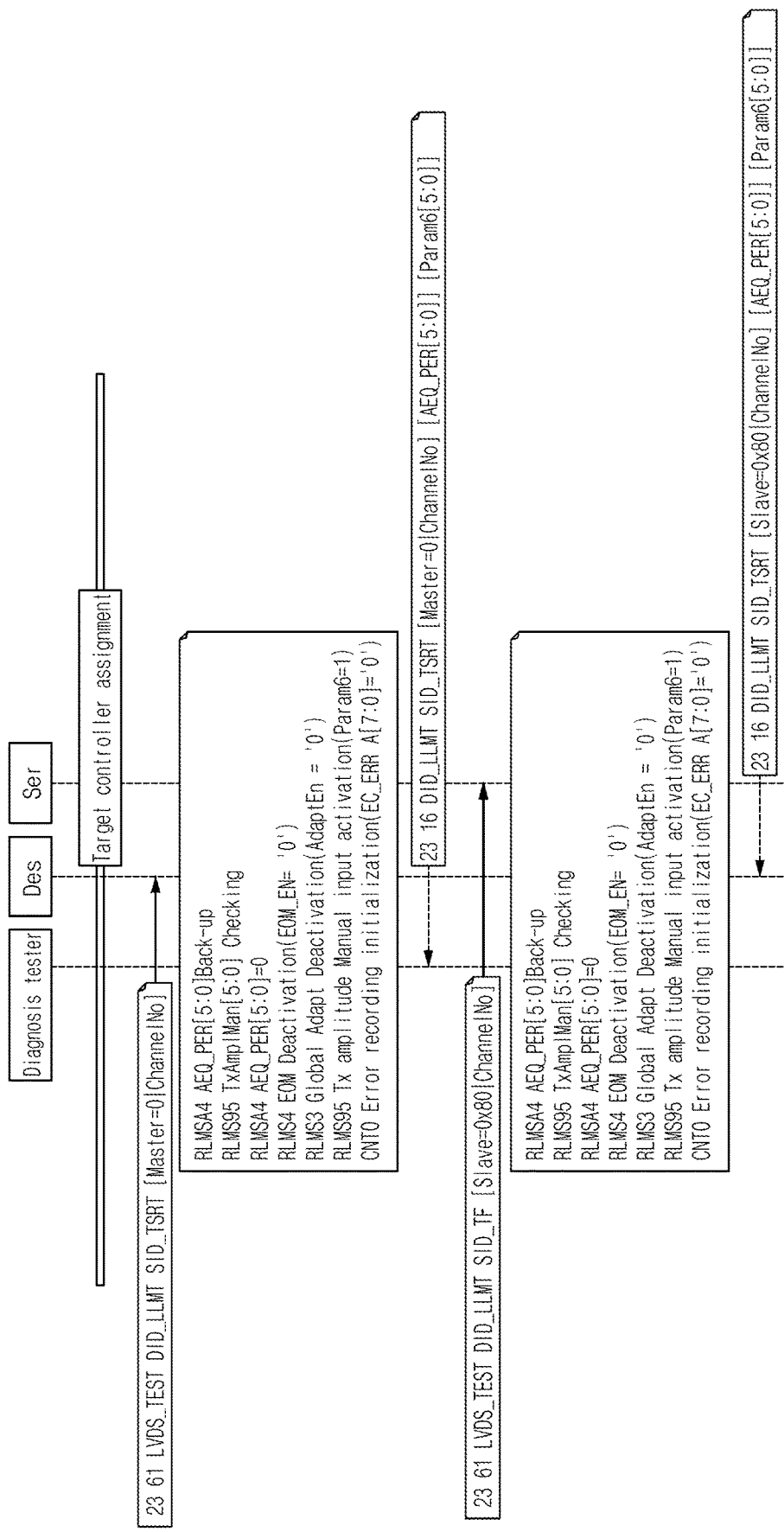
FIG. 12 schematically illustrates a diagnostic procedure of a link margin test according to various exemplary embodiments of the present invention.

FIG. 12 schematically illustrates a diagnostic procedure of a link margin test according to various exemplary embodiments of the present invention.

A normal output voltage level range of a communication line (signal line, connector, cable, etc. on the board) between the serializer and the deserializer may be obtained through a link margin test diagnostic service.

DID_LLMT (see Table 3) is used for the DID of the link margin test. The SID may start with SID_TSRT and end with SID_TF, and a required parameter depending on the SID may be set by a user.

Figure 13:
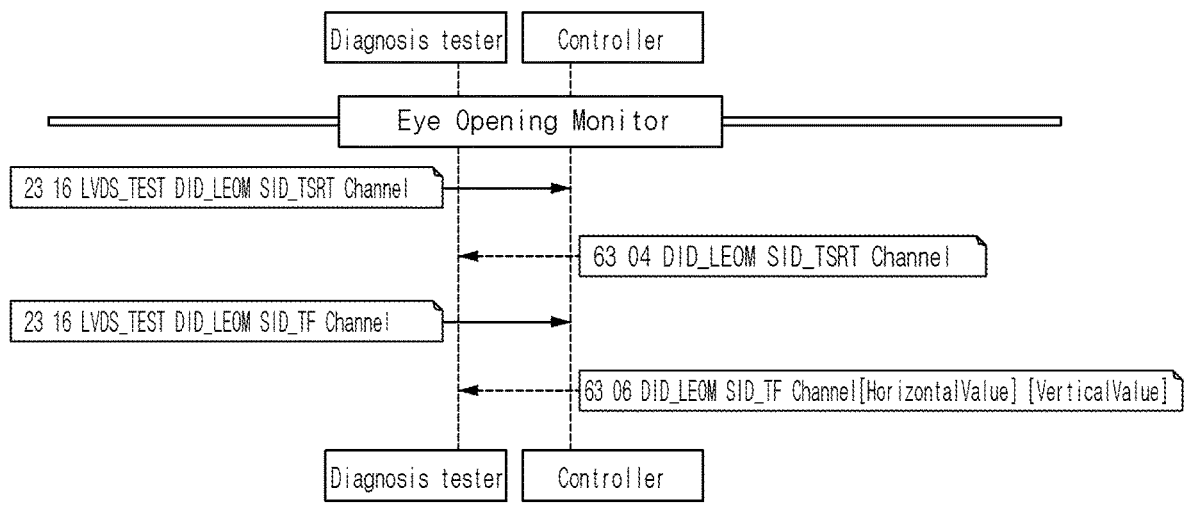
FIG. 13 schematically illustrates a diagnostic procedure of an eye opening monitor according to various exemplary embodiments of the present invention.

FIG. 13 schematically illustrates a diagnostic procedure of an eye opening monitor according to various exemplary embodiments of the present invention.

Horizontal and vertical eye opening monitoring (EOM) values may be checked at Rx stages of a serializer and a deserializer through a diagnosis service of the eye opening monitor. A diagnostic mode needs to be maintained until results are available.

DID_LEOM (see Table 3) is used for the DID of the eye opening monitor. The SID may start with SID_TSRT and end with SID_TF, and a required parameter depending on the SID may be set by a user.

Figure 14:
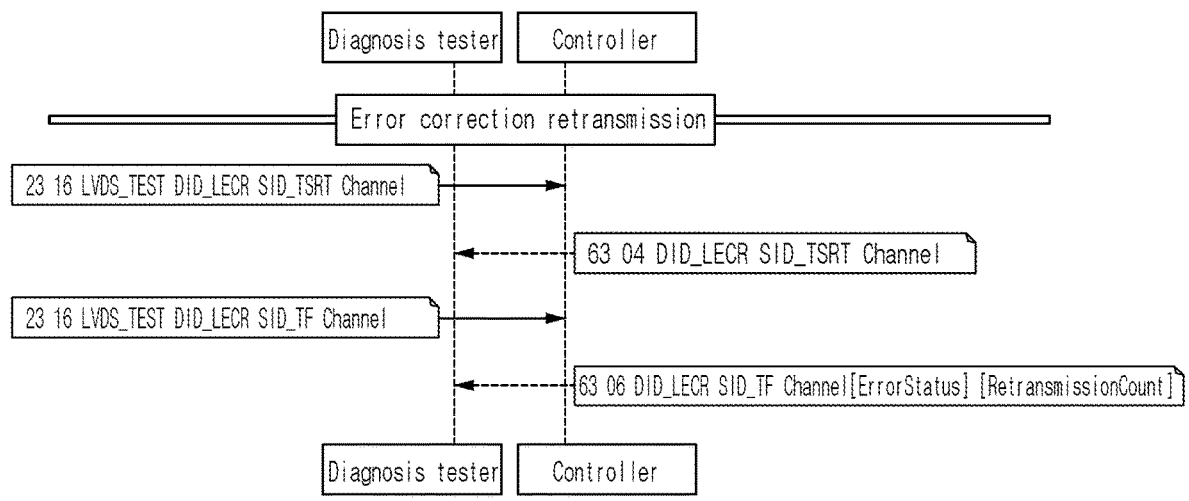
FIG. 14 schematically illustrates a diagnostic procedure of error correction through retransmission count according to various exemplary embodiments of the present invention.

FIG. 14 schematically illustrates a diagnostic procedure of error correction through retransmission count according to various exemplary embodiments of the present invention.

It can be checked whether transmission of control channel signals (I2C, UART, SPI, GPIO, Audio) between serializers or deserializers is normally performed and whether a failure continues even after exceeding a certain number of retransmissions through a diagnosis service of the error correction through retransmission count.

DID_LECR (refer to Table 3) is used for the DID of the error correction through retransmission count. The SID may start with SID_TSRT and end portion with SID_TF, and a required parameter depending on the SID may be set by a user.

Figure 15:
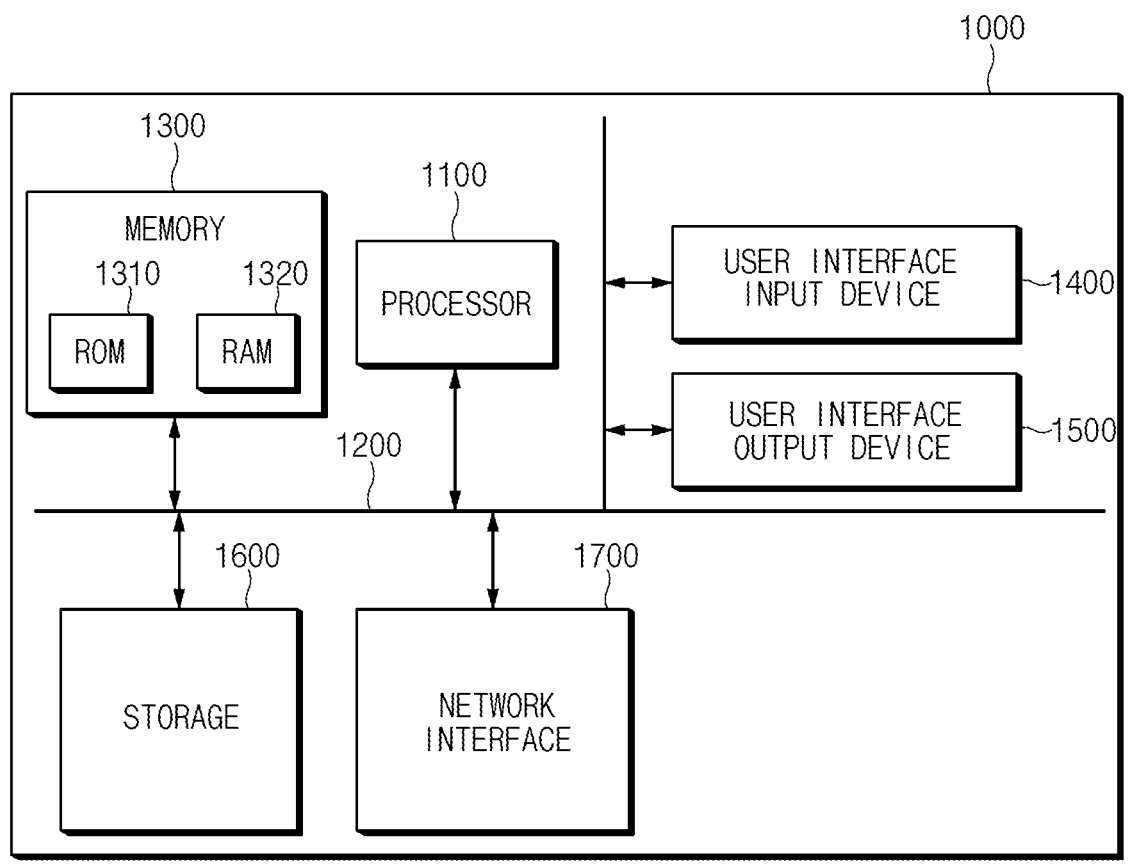
FIG. 15 illustrates a computing system according to various exemplary embodiments of the present invention.

FIG. 15 illustrates a computing system according to various exemplary embodiments of the present invention.

Referring to FIG. 15, the computing system 1000 includes at least one processor 1100 connected through a bus 1200, a memory 1300, a user interface input device 1400, a user interface output device 1500, and a storage 1600, or a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A communication error diagnosis apparatus for a vehicle, the communication error diagnosis apparatus comprising:
   a processor configured to transmit a request message including diagnostic identifiers for diagnosing a plurality of controllers that perform vehicle functions and sequence identifiers of the controllers to the controllers depending on a sequence to receive response messages, and configured to analyze a low voltage differential signaling (LVDS) communication errors between the plurality of controllers based on the response messages received from the controllers; and
   a storage configured to store data and algorithms driven by the processor,
   wherein the processor is further configured to transmit a request message for requesting setting of a parameter for performing diagnosis of a first controller performing a first function of the vehicle among the controllers to the first controller, which is a master, the first controller configured to set the parameter and to release the setting of the parameter after performing diagnosis.

2. The communication error diagnosis apparatus of claim 1, wherein the request message includes a diagnostic Identifier (DID), a sequence Identifier (SID), and input variables for the SID.

3. The communication error diagnosis apparatus of claim 2, wherein the DID includes at least one of device connection information; a line fault diagnostic service for diagnosing short-circuit or disconnection in transmission lines; a lock indicator diagnostic service for diagnosing whether connection between the controllers in a vehicle system is made; an ERRB indicator FWD channel diagnostic service for diagnosing occurrence of a bit error in a signal received from a receiving end; an ERRB indicator REV channel diagnostic service for diagnosing occurrence of a bit error in a signal received from a transmitter; or an eye opening monitor diagnostic service.

4. The communication error diagnosis apparatus of claim 2, wherein the SID includes diagnosis start, diagnosis step, and diagnosis end.

5. The communication error diagnosis apparatus of claim 1, wherein the response message includes a DID, a SID, and a response result.

6. A communication error diagnosis system for a vehicle, the communication error diagnosis system comprising:
   a first controller configured to perform a first function of the vehicle;
   a second controller configured to perform a second function of the vehicle; and
   a communication error diagnosis apparatus configured to transmit a request message including a DID and a SID for diagnosis of the first controller to the first controller, to receive a response message from the first controller, to transmit a request message including a DID and a SID for diagnosis of the second controller to the second controller to receive a response message from the second controller, and to analyze a low voltage differential signaling (LVDS) communication error between the first controller and the second controller based on the response message of the first controller and the response message of the second controller,
   wherein the communication error diagnosis apparatus is further configured to transmit a request message for requesting setting of a fourth parameter for performing diagnosis of the first controller to the first controller, which is a master, and
   wherein the first controller is configured to set the fourth parameter and releases the setting of the fourth parameter after performing the diagnosis.

7. The communication error diagnosis system of claim 6, wherein the first controller and the second controller are included in a vehicle system, and the communication error diagnosis apparatus communicates with the first controller and the second controller outside the vehicle system.

8. The communication error diagnosis system of claim 6, further including:
   an on board diagnostics (OBD) port configured to connect the communication error diagnosis apparatus and the vehicle system.

9. The communication error diagnosis system of claim 8, further including:
   a gateway configured to perform communication with the communication error diagnosis apparatus in a first communication method and to communicate with the first controller and the second controller in a second communication method.

10. The communication error diagnosis system of claim 9, wherein the first communication method is a D-HSCAN, and
    wherein the second communication method is Ethernet.

11. The communication error diagnosis system of claim 6, wherein
    the communication error diagnosis apparatus is configured to transmit a request message including a DID, a SID, and master role assignment for diagnosis of the first controller to the first controller, and to receive a response message thereto from the first controller.

12. The communication error diagnosis system of claim 6, wherein the communication error diagnosis apparatus receives the response message from the first controller, and then, transmits a request message including a DID, a SID, and slave role assignment for diagnosis of the second controller to the second controller, and receives a response message thereto from the second controller.

13. The communication error diagnosis system of claim 6, wherein the communication error diagnosis apparatus is configured to transmit a request message checking setting of a first parameter for diagnostic preparation of the first controller to the first controller, and receive a response message thereto from the first controller.

14. The communication error diagnosis system of claim 13, wherein the communication error diagnosis apparatus receives the response message from the first controller, and then transmits a request message checking setting of a second parameter for diagnostic preparation of the second controller to the second controller, and receives a response message thereto from the second controller.

15. The communication error diagnosis system of claim 14, wherein when the settings of the first parameter of the first controller and the second parameter of the second controller are checked, the communication error diagnosis apparatus is configured to transmit a request message for requesting setting of a third parameter for performing diagnosis of the second controller to the second controller, which is a slave, and receives a response message thereto from the second controller.

16. The communication error diagnosis system of claim 15, wherein the second controller includes a value configured for distinguishing between a normal state and an error state in the response message and transmits the value to the vehicle communication error diagnosis apparatus.

17. The communication error diagnosis system of claim 15, wherein the first controller transmits a diagnostic result of the first controller to the communication error diagnosis apparatus.

18. The communication error diagnosis system of claim 17, wherein the communication error diagnosis apparatus,
when a diagnostic result is received from the first controller and the second controller,
transmits a request message for requesting termination of the diagnosis of the second controller to the second controller, when a response message thereto is received from the second controller,
transmits a request message for requesting termination of the diagnosis of the first controller to the first controller, and when a response message thereto is received from the first controller,
terminates a diagnosis process.

19. A communication error diagnosis method for a vehicle, the communication error diagnosis method comprising:
transmitting, by a processor, a request message including a DID and a SID for diagnosis of a first controller performing a first function of the vehicle to the first controller;
receiving, by the processor, a response message from the first controller;
transmitting, by the processor, a request message including a DID and a SID for diagnosis of a second controller performing a second function of the vehicle to the second controller;
receiving, by the processor, a response message from the second controller; and
analyzing, by the processor, a low voltage differential signaling (LVDS) communication error between the first controller and the second controller based on the response message of the first controller and the response message of the second controller,
wherein the processor is further configured to transmit a request message for requesting setting of a parameter for performing diagnosis of the first controller to the first controller, which is a master, and
wherein the first controller is configured to set the parameter and releases the setting of the parameter after performing diagnosis.

* * * * *